(12) United States Patent
Pütz et al.

(10) Patent No.: US 11,920,692 B2
(45) Date of Patent: Mar. 5, 2024

(54) SLIDE VALVE AND USE OF A SLIDE VALVE

(71) Applicant: Z & J Technologies GmbH, Düren (DE)

(72) Inventors: Robert Pütz, Düren (DE); Markus Gandelheidt, Alsdorf (DE); Paulus Friedhelm, Hürtgenwald (DE); Sebastian Buzga, Grevenbroich (DE)

(73) Assignee: Z & J Technologies GmbH, Düren (DE)

( * ) Notice: Subject to any disclaimer, the term of this patent is extended or adjusted under 35 U.S.C. 154(b) by 0 days.

(21) Appl. No.: 16/964,162

(22) PCT Filed: Jan. 18, 2019

(86) PCT No.: PCT/EP2019/051271
§ 371 (c)(1),
(2) Date: Jul. 22, 2020

(87) PCT Pub. No.: WO2019/145231
PCT Pub. Date: Aug. 1, 2019

(65) Prior Publication Data
US 2021/0033198 A1 Feb. 4, 2021

(30) Foreign Application Priority Data
Jan. 23, 2018 (DE) .......................... 102018101472.4

(51) Int. Cl.
*F16K 3/14* (2006.01)
*C10B 25/10* (2006.01)
(Continued)

(52) U.S. Cl.
CPC ................ *F16K 3/14* (2013.01); *C10B 25/10* (2013.01); *C10B 33/12* (2013.01); *F16K 3/186* (2013.01);
(Continued)

(58) Field of Classification Search
CPC .......... F16K 3/14; F16K 3/314; F16K 31/047; F16K 31/04; F16K 31/50; F16K 31/53;
(Continued)

(56) References Cited

U.S. PATENT DOCUMENTS 1,467,069 A * 9/1923 Schehr ..................... F16K 3/186
251/142
2,596,532 A * 5/1952 Coolidge .............. F16K 31/143
254/133 R (Continued)

FOREIGN PATENT DOCUMENTS

CN 2169001 Y 6/1994
CN 202834302 U 3/2013
(Continued)

OTHER PUBLICATIONS

PCT Notification of Transmittal of the International Search Report and the Written Opinion of the International Searching Authority, or the Declaration, International Searching Authority, International Application No. PCT/EP2019/051271, dated Jan. 18, 2019, 25 pages.

(Continued)

*Primary Examiner* — John Bastianelli
(74) *Attorney, Agent, or Firm* — Cesari and McKenna, LLP

(57) ABSTRACT

A slide valve for chemical and/or petrochemical plants, in particular of the round, oval or flat slide valve type, having a locking device (11) which is movable by a slide rod (12) into an open and closed position, and a drive which has an electric motor (13) for adjusting the slide rod (12), the locking device (11) having two lock plates (14, 15), between which a wedge arrangement (16) for pressing the lock plates (14, 15) against body seal seats (17) of the slide valve is arranged and connected to the slide rod (12), wherein the drive has a spindle drive (18) which is aligned with the slide (Continued)

rod (12) and connected thereto for transmitting an actuating force.

10 Claims, 1 Drawing Sheet

(51) Int. Cl.
*C10B 33/12* (2006.01)
*F16K 3/18* (2006.01)
*F16K 3/314* (2006.01)
*F16K 31/04* (2006.01)
*F16K 31/50* (2006.01)
*F16K 31/53* (2006.01)

(52) U.S. Cl.
CPC .............. *F16K 3/314* (2013.01); *F16K 31/04* (2013.01); *F16K 31/047* (2013.01); *F16K 31/50* (2013.01); *F16K 31/53* (2013.01)

(58) Field of Classification Search
CPC ... F16K 3/16; F16K 3/18; F16K 3/184; F16K 3/186; C10B 25/10; C10B 33/12; Y02P 20/129
USPC ................. 251/204, 251/263, 129.11–129.13
See application file for complete search history.

(56) References Cited

U.S. PATENT DOCUMENTS

| | | | | |
|---|---|---|---|---|
| 2,917,069 A * | 12/1959 | Lundy | ................. | F16K 3/26 |
| | | | | 137/240 |
| 3,026,084 A * | 3/1962 | Bryant | ................. | F16K 3/316 |
| | | | | 251/327 |
| 3,029,842 A * | 4/1962 | Arkelyan | ................. | F16K 3/186 |
| | | | | 251/200 |
| 3,032,069 A * | 5/1962 | Ficklin | ................. | F16L 55/124 |
| | | | | 137/315.27 |
| 3,041,037 A * | 6/1962 | Patrick | ................. | F16K 31/04 |
| | | | | 251/195 |
| 3,198,478 A * | 8/1965 | Johnston | ................. | F16K 31/05 |
| | | | | 251/85 |
| 3,695,578 A * | 10/1972 | Walther | ................. | F16K 3/14 |
| | | | | 251/327 |
| 3,704,853 A * | 12/1972 | Waller | ................. | F16K 31/047 |
| | | | | 251/59 |
| 4,347,865 A | 9/1982 | Worley | | |
| 4,378,817 A * | 4/1983 | Houston | ................. | B22D 41/24 |
| | | | | 137/315.31 |
| 4,505,452 A * | 3/1985 | Bragin | ................. | F16K 3/02 |
| | | | | 251/326 |
| 4,779,649 A * | 10/1988 | Balter | ................. | F16K 3/186 |
| | | | | 251/197 |
| 4,936,340 A * | 6/1990 | Potter | ................. | G05D 16/202 |
| | | | | 137/487.5 |
| 5,029,597 A | 7/1991 | Leon | | |
| 5,704,594 A | 1/1998 | Wurangian | | |
| 5,832,944 A | 11/1998 | Lindner | | |
| 6,333,445 B1 * | 12/2001 | O'Brien | ................. | F25J 3/062 |
| | | | | 585/809 |
| 2012/0286182 A1 | 11/2012 | Hoang et al. | | |
| 2012/0319025 A1 * | 12/2012 | Shu | ................. | F16K 3/0209 |
| | | | | 251/328 |
| 2014/0306134 A1 | 10/2014 | Schubert et al. | | |
| 2015/0034851 A1 * | 2/2015 | Hoang | ................. | F16K 3/14 |
| | | | | 251/195 |
| 2015/0184758 A1 * | 7/2015 | Hoang | ................. | F16K 3/186 |
| | | | | 251/200 |
| 2016/0003363 A1 * | 1/2016 | Blecha | ................. | F16K 3/18 |
| | | | | 251/326 |
| 2016/0281860 A1 * | 9/2016 | Travnicek | ................. | F16K 3/029 |

FOREIGN PATENT DOCUMENTS

| | | |
|---|---|---|
| CN | 104806777 A | 7/2015 |
| CN | 106168308 A | 11/2016 |
| DE | 1199088 A | 8/1965 |
| DE | 4011274 C1 | 8/1991 |
| DE | 69503136 T2 | 4/1999 |
| DE | 102008019182 A1 | 10/2009 |
| DE | 102011001186 A1 | 7/2012 |
| DE | 112013002262 T5 | 4/2015 |
| DE | 202016102559 U1 | 6/2016 |
| DE | 202016102554 U1 | 7/2016 |
| EP | 0727601 A1 | 8/1996 |
| EP | 2241792 A2 | 10/2010 |
| EP | 2855985 A | 4/2015 |
| FR | 1 493 479 | 9/1967 |
| FR | 1493479 | 9/1967 |
| GB | 2527906 A | 1/2016 |
| GB | 2527906 A | 6/2016 |
| JP | 2573498 Y2 | 5/1998 |
| JP | 2014-80996 A | 5/2014 |
| JP | 2015518125 A | 6/2015 |
| RU | 2193129 C1 | 11/2002 |
| RU | 2506304 C2 | 2/2014 |
| RU | 2534984 C2 | 12/2014 |
| RU | 2540864 C2 | 2/2015 |
| RU | 2570795 C1 | 12/2015 |
| RU | 2577337 C2 | 3/2016 |
| RU | 2589557 C2 | 7/2016 |
| SU | 313941 A1 | 12/1971 |
| SU | 335482 A1 | 12/1972 |
| SU | 573676 A1 | 9/1977 |
| UA | 74297 C2 | 11/2005 |
| WO | WO-92-21901 | 12/1992 |
| WO | WO-2012-154206 | 11/2012 |

OTHER PUBLICATIONS

EP office action dated Oct. 5, 2021 for European Patent Application No. 19 701 210.7.
CN Office Action and Search Report dated Dec. 27, 2021, CN Application No. 201980009242.8, 9 pages.
English Translation of CN Office Action and Search Report dated Dec. 27, 2021, CN Application No. 201980009242.8, 9 pages.
Japanese Office Action, patent application No. 2020-540733, including English Translation, dated Jul. 12, 22, 11 pages.
Kubata Sluice Catalog of Electric Partition Valves, 15 pages.
Kubata Catalog of Valves, 7 pages.

* cited by examiner

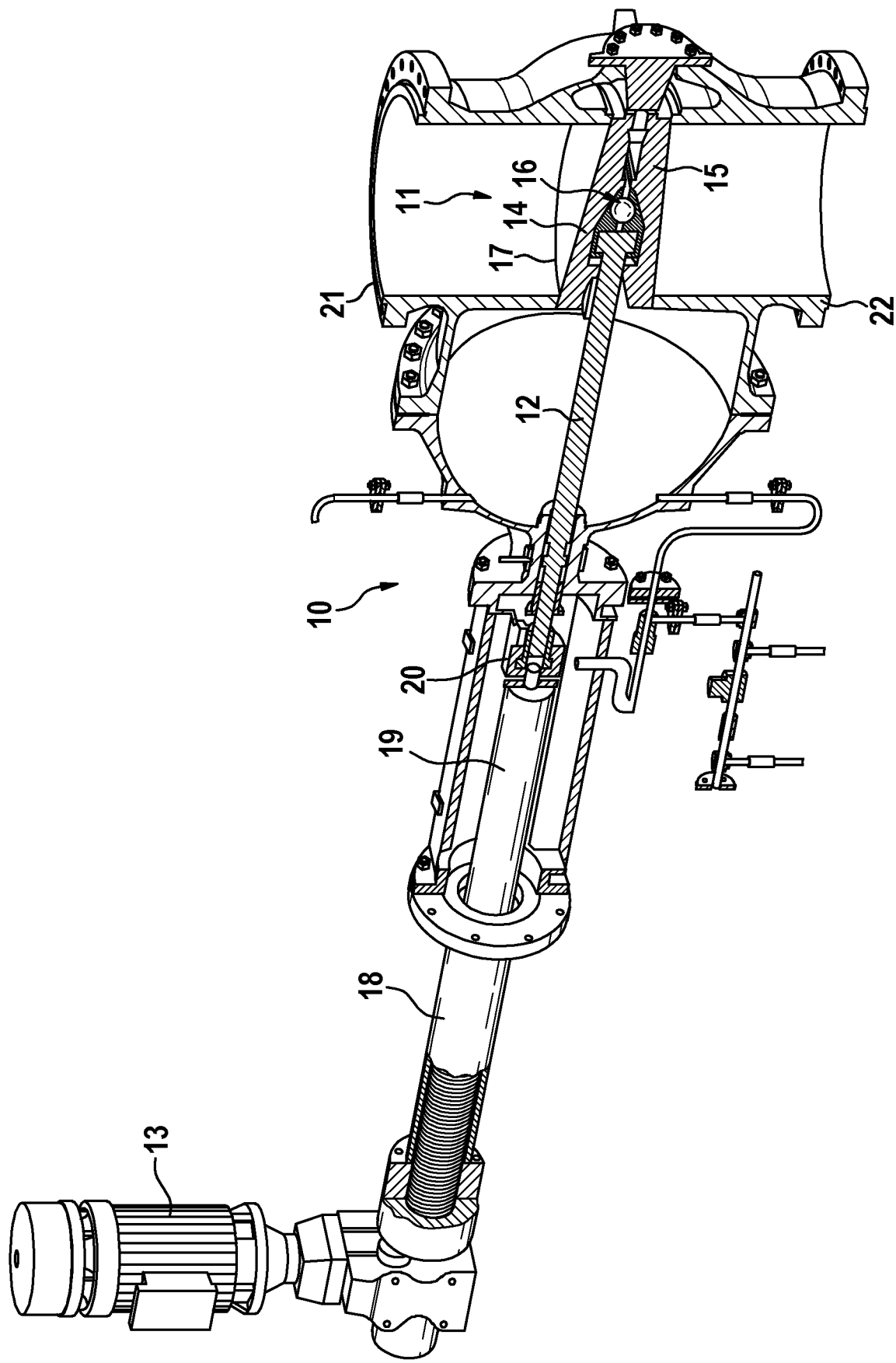

SLIDE VALVE AND USE OF A SLIDE VALVE

CROSS REFERENCE TO RELATED APPLICATIONS

This application is the National Stage of International Application No. PCT/EP2019/051271, filed Jan. 18, 2019, which claims the benefit of German Patent Application No. 102018101472.4 filed on Jan. 23, 2018. The contents of all applications are hereby incorporated by reference in their entirety.

DESCRIPTION

The invention relates to a slide valve for chemical and/or petrochemical plants. Such a slide valve is known from D 10 2011 001 186 A1, for example.

In order to control gas and solid flows, slide valves are used in the chemical and petrochemical industry, which have a lock device which is slidably mounted in a housing and unblocks or closes a valve opening in the housing by means of a stroke movement. Such valves are intended to provide long maintenance-free operating times at high operating temperatures, large nominal diameters and high switching frequencies.

The well-known slide valve is a coker slide valve whose slide rod is connected to a double spindle drive via a yoke. The double spindle drive can transmit large driving forces to the slide rod. However, special measures must be taken to achieve a uniform advance of the two double spindles.

The invention is based on the object of specifying a slide valve for chemical and/or petrochemical plants, which enables a simple operating of the slide rod with as low maintenance as possible. The object underlying the invention is further to specify the use of a slide valve.

According to the invention, the object is solved by a slide valve having the features as claimed.

Specifically, the object is solved by a slide valve for chemical and/or petrochemical plants, in particular in round, oval or flat slide valve design, which has a locking device that is movable into an open and closed position by a slide rod. The slide valve also has a drive with an electric motor for adjusting the slide rod. The locking device has two lock plates, between which a wedge arrangement is arranged for pressing the lock plates against body seal seats of the slide valve. The wedge arrangement is connected to the slide rod. The drive has a spindle drive which is aligned with the slide rod and connected to it to transmit an actuating force.

The invention has the advantage that hydraulic fluid is not required. This also eliminates the field piping required for hydraulic drives, the risk of leaks, flushing of the lines and the relatively intensive maintenance of the system. At the same time, the slide valve has a robust design and is adapted for use under harsh conditions.

The spindle drive has the advantage of high feed speeds as well as a precise actuating movement to achieve the stroke of the lock plates. In the closed position, the wedge arrangement causes the lock plates to force apart so that they are pressed against the body seal seats of the slide valve. This creates a reliable seal during operation of the slide valve. To open the slide valve, the wedge arrangement is released and the expansion is removed, so that the contact pressure is reduced. This reduces the wear of the lock plates when opening the slide valve.

The coupling of the spindle drive via the slide valve rod with the wedge arrangement has the advantage that the contact pressure of the lock plates generated by the wedge arrangement, which acts on the body seal seats, can be precisely adjusted. The interaction of the electric drive with the spindle drive for electromechanical transmission of the drive torque to the slide rod is advantageous.

Preferred embodiments of the invention are indicated in the dependent claims.

Thus, the spindle drive can have a spindle and a spindle nut. In this embodiment, the spindle is moved translationally, but not rotatably. The conversion of the rotary motion of the electric motor into the translational motion of the spindle is done by the spindle nut. The spindle nut is stationary in the translational direction.

Preferably, a coupling piece connects the spindle and the slide rod. The coupling piece can be provided as a crosshead, for example. Other coupling pieces are possible. The coupling piece allows for a simple connection between the spindle and the slide rod. The coupling piece can be detachable for maintenance purposes.

Preferably, the spindle drive has a recirculating ball bearing element. The recirculating ball element can be designed as a recirculating ball nut. This allows to achieve a large advance with high precision of the actuating movement.

Alternatively, the spindle drive can have a planetary roller spindle. This also ensures a precise advance. The drive works essentially backlash-free.

A gear, in particular a worm gear, can be arranged between the spindle drive and the electric motor. This provides a transmission of the drive torque or drive speed. The worm gear has the advantage that it is self-locking and loadable.

To optimize the installation space, the spindle drive and the electric motor can be arranged in an L-shape. Other positions of the electric motor are possible.

If the electric motor is designed as a brake motor with a mechanical brake, the safety against unintentional adjustment of the locking device is increased.

As an alternative or in addition to the design as a brake motor, the electric motor may have a clutch for torque limitation. Here too, safety against unintentional adjustment of the locking device is increased. If the electric motor is connected to a frequency converter, the rotational speed of the electric motor can be variably adjusted.

In the context of the invention, the use of the inventive slide valve as a gate valve in a propane dehydrogenation plant (PDH plant) is claimed.

In general, olefins and hydrogen are produced by dehydrogenation of hydrocarbons with oxidative catalyst regeneration. Light olefins (ethylene, propene, butenes) are important industrial raw materials that are used extensively in the production of polymers, paints, coatings and other chemicals. These olefins are obtained by steam cracking of light crude oil (naphtha) or by Fluid Catalytic Cracking (FCC) of heavy oil. An alternative to steam cracking and the FCC process is the dehydrogenation of hydrocarbons such as propane and butane. These are non-oxidative and oxidative processes using catalysts.

Another example of propane dehydrogenation for the production of propylene is the CATOFIN® process.

The Catofin® dehydrogenation process is a catalytic technology that ensures an extraordinarily high conversion of paraffins into olefins due to its thermodynamic operating characteristics. During the process, isobutylene, n-butene or propylene are produced from isobutane, n-butane or propane, respectively.

In this context, slide valves from Z&J ensure the cyclic isolation of numerous process media of the catalytic process as well as the required regeneration phase. The reliable wedge-in-wedge mechanism in combination with the two slide plates independent from each other ensures the maximum required tightness and durability of the fitting for use in this demanding catalytic process.

In the context of the invention, also the use of the slide valve as a coker valve in a delayed coking plant is disclosed and claimed. Furthermore, the use of the slide valve as a double disc through conduit type valve in the main transfer and decoking line of an ethylene plant or in a Fluidized Catalytic Cracking Unit (FCCU), in particular in the overhead vapor and fractionator bottom line of a Fluidized Catalytic Cracking Unit, or in a coal gasification plant or in a visbreaker plant or in an epichlorohydrin plant is claimed. In addition, the use of the slide valve is claimed as a gate valve in an Isosiv/TIP plant based on the UOP process or Cyclic Power Former Unit or ethylene plant or Fluidized Catalytic Cracking Unit (FCCU) or coal gasification plant or cupola furnace plant or in a Zinc melting furnace or waste heat boiler.

The invention is explained in more detail below by means of an example of an embodiment with reference to the attached single schematic FIGURE.

The only FIGURE shows a drive with an electric motor in a perspective view, which is coupled with a gate valve (partial section).

The slide valve 10 is designed as a gate valve for a PDH plant, in particular a CATOFIN® plant operating according to the Houdry process. The slide valve has a locking device 11 which, in the illustrated closed position of the slide valve 10, is arranged between two pipe connections 21, 22 and shuts off these or the pipes connected to the pipe connections 21, 22 in the mounted state, respectively. To actuate the locking device 11, it is connected to a slide rod 12 which is movable in the axial direction together with the locking device 11. In the open position not shown here, the locking device 11 is moved out of the pipe passage and unblock it.

The locking device 11 comprises 2 lock plates 14, 15, which are arranged concentrically. Between the two lock plates 14, 15 there is a wedge arrangement 16. The wedge arrangement 16 has two wedge pieces which are centered by a ball located between the parts. When closed, the wedge pieces are in contact with and slide on correspondingly inclined mating surfaces on the inside of the lock plates 14, 15. This converts a closing force of the slide rod 12 in the axial direction into a sealing force perpendicular to the two lock plates 14, 15. The two lock plates 14, 15 are spread apart by the wedge arrangement 16 in the closed position and thereby pressed against the body seal seats 17. For opening, the wedge arrangement 16 is pulled back from the mating surfaces so that the spreading effect is reduced. In this way the lock plates 14, 15 can be moved past the body seal seats 17 with low contact pressure, thus reducing wear.

As shown in the only FIGURE, the slide rod 12 is connected to the wedge arrangement 16. The slide rod 12 can thus transmit the adjustment force required for the stroke movement of the locking device 11 and the contact pressure of the two lock plates 14, 15 to the body sealing seats 17.

The slide valve rod 12 is connected to an electric motor 13 of the drive for adjusting the slide valve rod 12. The drive has a spindle drive 18, which, as shown in the only FIGURE, is in alignment with the slide rod 12. In other words, a single spindle drive 18 is assigned to the gate valve 12, which is in line with the slide rod 12 to transmit the linear force in the translational direction.

The spindle drive 18 is mechanically connected to the slide rod 12 on the one hand and to the electric motor 13 on the other hand, so that the drive torque generated by the electric motor 13 is transmitted to the slide rod 12 via the spindle drive 18. To move the locking device 11 to the open position or to the closed position, the direction of rotation of the electric motor 13 is changed.

The spindle drive 18 has a spindle nut (not shown) and a spindle 19, which is connected to the spindle rod 12. The connection can be made, for example, with a coupling piece 20, as shown in the single FIGURE. The spindle nut is located stationary in the translational direction of the spindle drive 18 and transmits the drive torque of the electric motor to the spindle 19 by means of a rotary motion. Thus, the rotary motion is converted into a translational motion of the spindle 19. The spindle nut can be designed as a recirculating ball nut, for example. Alternatively, the spindle drive 18 can be provided as a planetary roller spindle. In the embodiment shown, a gear is arranged between the electric motor 13 and the spindle drive 18. The gear can be a worm gear, for example. Other gear types are possible. The electric motor 13 and the spindle drive 18 are arranged in an L-shape. The L-shape can be achieved, for example, by the worm gear.

The electric motor is designed as a brake motor and has a mechanical brake. Furthermore, the electric motor 13 has a manual emergency operation. The spindle drive 18 is equipped with a position indicator and a corresponding sensor for determining the position signal of the spindle drive 18.

The electromechanically driven slide valve has the advantage that no hydraulic fluid is required in comparison to conventional slide valves. This also eliminates the risk of leakage and field piping. The heating of the field piping required in certain climatic areas is not necessary. Flushing of the hydraulic line is not necessary. The gate valve is characterized by its robust design and is low maintenance.

LIST OF REFERENCE SIGNS 10 slide valve
11 locking device
12 slide rod
13 electric motor
14 first lock plate
15 second lock plate
16 wedge arrangement
17 body seal seats
18 spindle drive
19 spindle
20 coupling piece

What is claimed is:

1. A slide valve comprising:
a slide rod configured and arranged to move a locking device into one of an open or closed position;
a drive having an electric motor configured to adjust the slide rod; and
two lock plates of the locking device between which a wedge arrangement is configured and arranged to press the lock plates against body seal seats of the slide valve such that the lock plates are spread apart by the wedge arrangement in the closed position, wherein the wedge arrangement is connected to the slide rod, and wherein the drive has a spindle drive aligned with the slide rod and connected thereto to transmit an actuating force, wherein the spindle drive has a spindle releasably connected to the slide rod via a coupling piece, wherein the wedge arrangement has two wedge pieces which are centered by a ball located between the wedge pieces, wherein the electric motor is a brake motor with a mechanical brake and includes a clutch for torque limitation.

2. The slide valve of claim 1 further comprising a worm gear configured and arranged between the spindle drive and the electric motor.

3. The slide valve of claim 1, wherein the spindle drive and the electric motor are configured and arranged in an L-shape.

4. The slide valve of claim 1, wherein the electric motor is connected to a frequency converter.

5. The slide valve of claim 1, wherein the slide valve is configured for use as a gate valve in a propane dehydrogenation plant.

6. The slide valve of claim 1, wherein the slide valve is configured for use as a coker valve in a delayed coking plant.

7. The slide valve of claim 1, wherein the slide valve is configured for use as a double disc through conduit type valve in one of (i) a main transfer and decoking line of an ethylene plant, (ii) a main transfer and decoking line of a Fluidized Catalytic Cracking Unit (FCCU), (iii) an overhead vapor and fractionator bottom line of a FCCU, (iv) a coal gasification plant, (v) a visbreaker plant, or (vi) an epichlorohydrin plant.

8. The slide valve of claim 1, wherein the slide valve is configured for use as a gate valve in one of (i) an Isosiv/TIP plant according to a UOP process, (ii) a Cyclic Power Former Unit, (iii) an ethylene plant, (iv) a Fluidized Catalytic Cracking Unit, (v) a coal gasification plant, (vi) a cupola furnace plant, (vii) a zinc melting furnace, or (viii) a waste heat boiler.

9. The slide valve of claim 1, wherein the valve is operated without use of hydraulic fluid.

10. The slide valve of claim 1, wherein the electric motor drives directly the spindle drive to provide the braking and torque limitation.

\* \* \* \* \*